United States Patent [19]

Salkeld et al.

[11] Patent Number: 4,634,526

[45] Date of Patent: Jan. 6, 1987

[54] SIDEWALL MOUNTED CLARIFIER

[75] Inventors: Melvin R. Salkeld, Elgin; Wayne E. Langeland, Carol Stream, both of Ill.; Jerry L. Kennedy, Jeffersontown, Ky.

[73] Assignee: Lakeside Equipment Corporation, Bartlett, Ill.

[21] Appl. No.: 780,676

[22] Filed: Oct. 24, 1985

[51] Int. Cl.[4] .............................................. B01D 21/00
[52] U.S. Cl. .................................... 210/194; 210/219; 210/521; 210/532.1
[58] Field of Search ............... 210/170, 521, 522, 525, 210/532.1, 923, 926, 194, 219

[56] References Cited

U.S. PATENT DOCUMENTS 4,487,692 12/1984 Kersten ................................ 210/194

Primary Examiner—Frank Sever
Attorney, Agent, or Firm—Wood, Dalton, Phillips, Mason & Rowe

[57] ABSTRACT

A waste water treatment system including a vessel having a closed loop flow path, a bottom and a wall. A clarifier is mounted on the vessel wall within the vessel and includes a clarifier wall which is elongated in the direction of the flow path and is relatively narrowly spaced from the vessel wall. A clarifier wall extends from the bottom to a location above the intended level of waste water to define a clarifying chamber that is relatively narrow. Inlets may be located along the length of the clarifier wall and the bottom wall of the clarifying chamber may be provided with sludge outlets.

14 Claims, 8 Drawing Figures

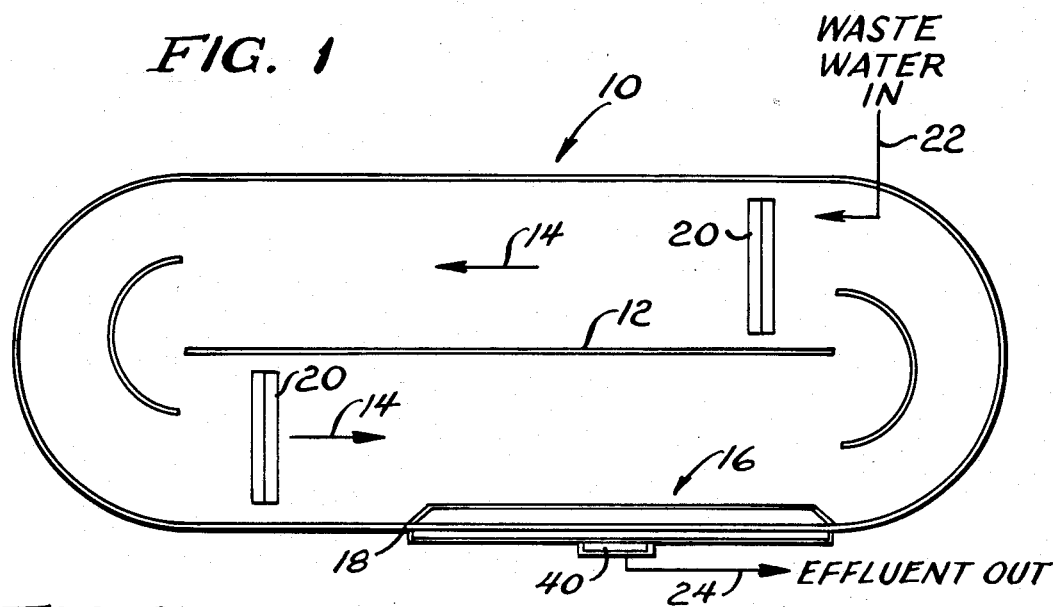
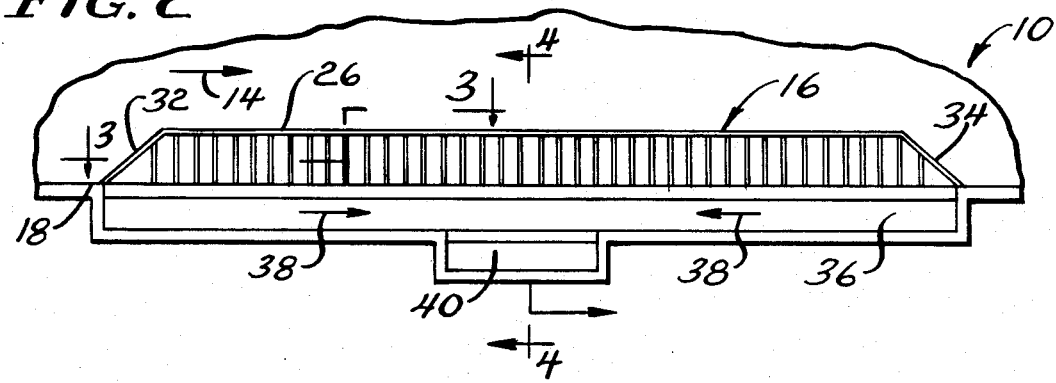
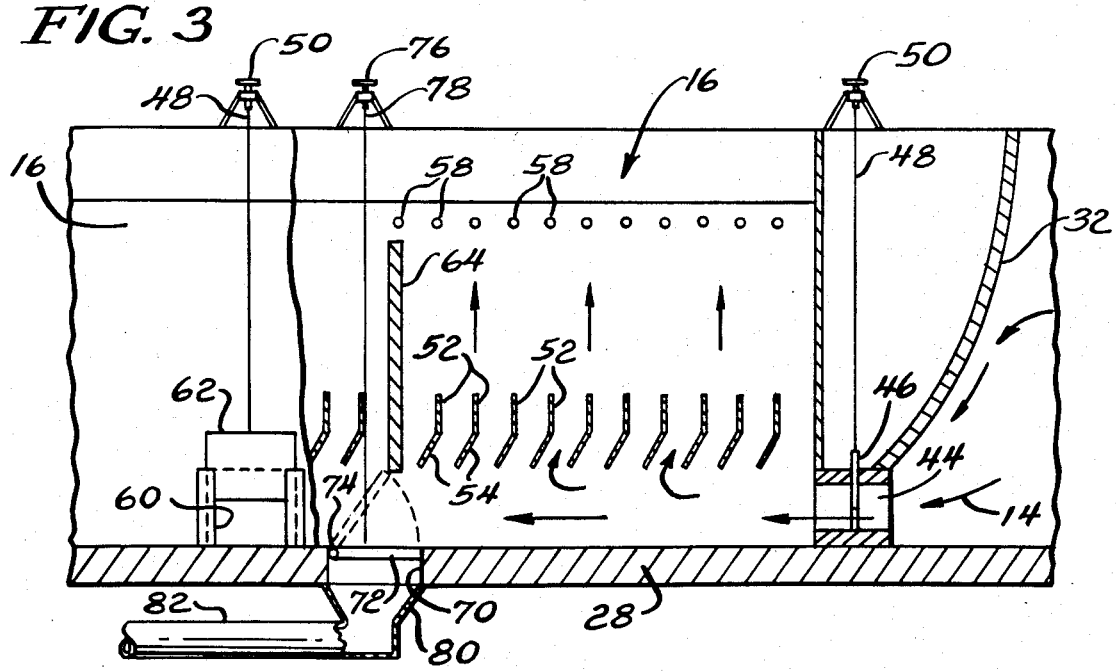

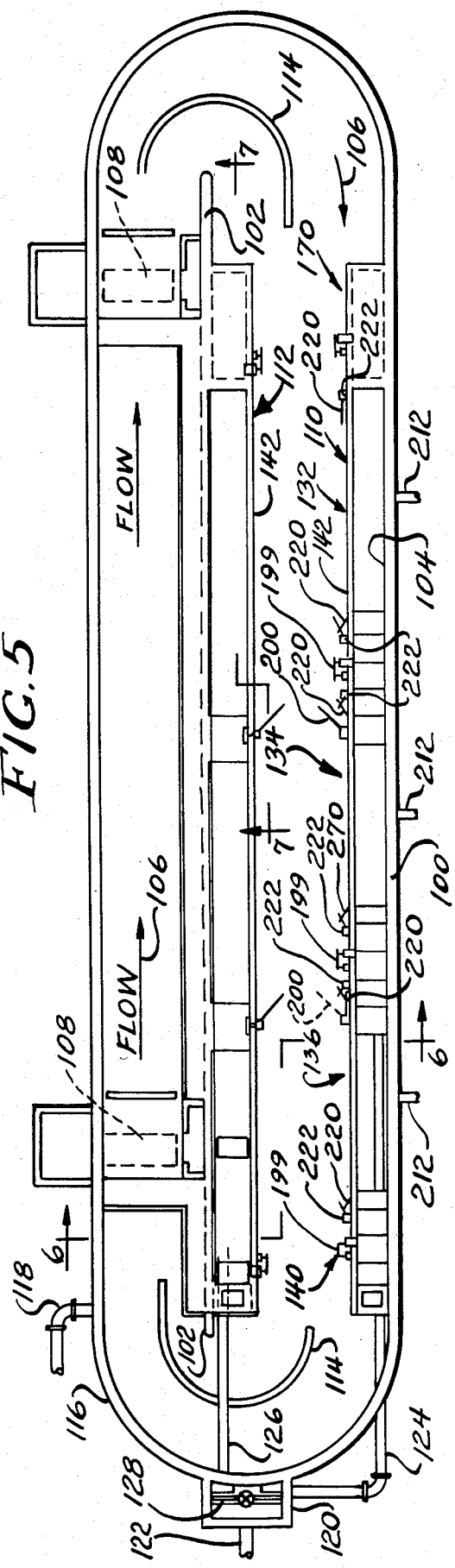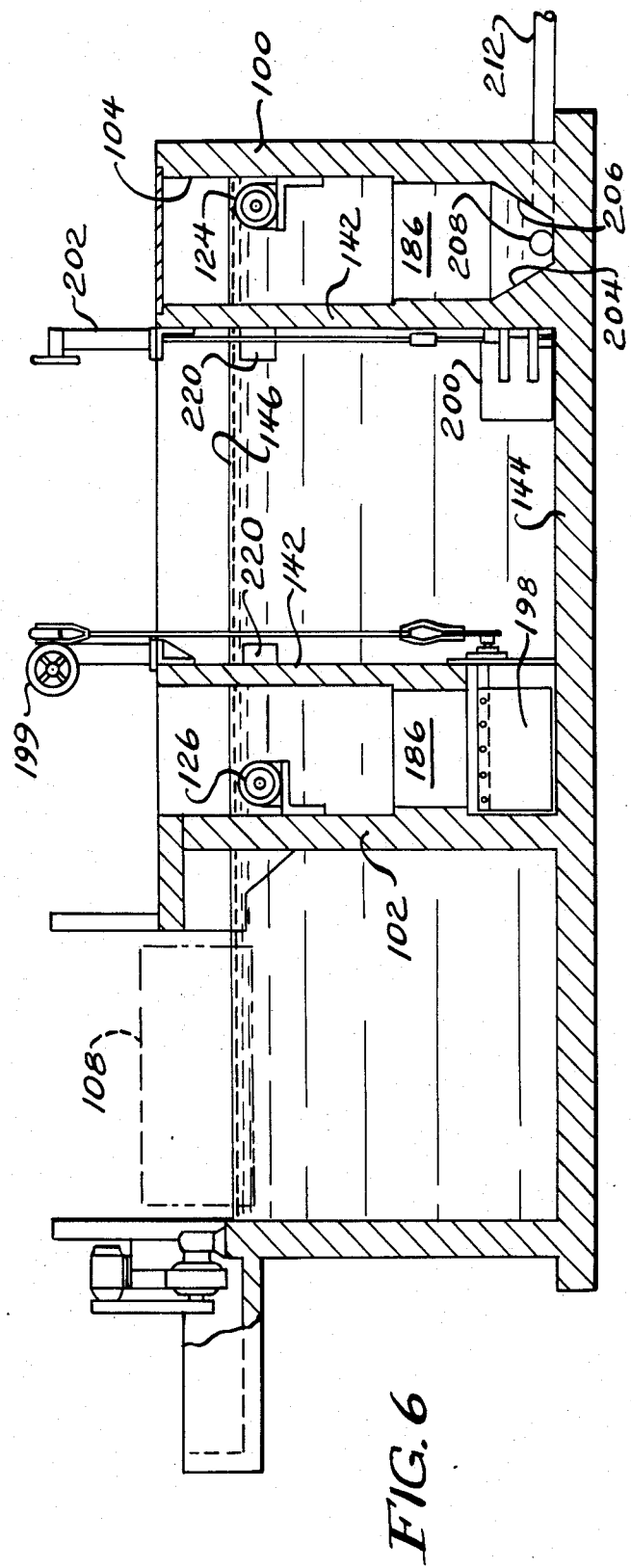

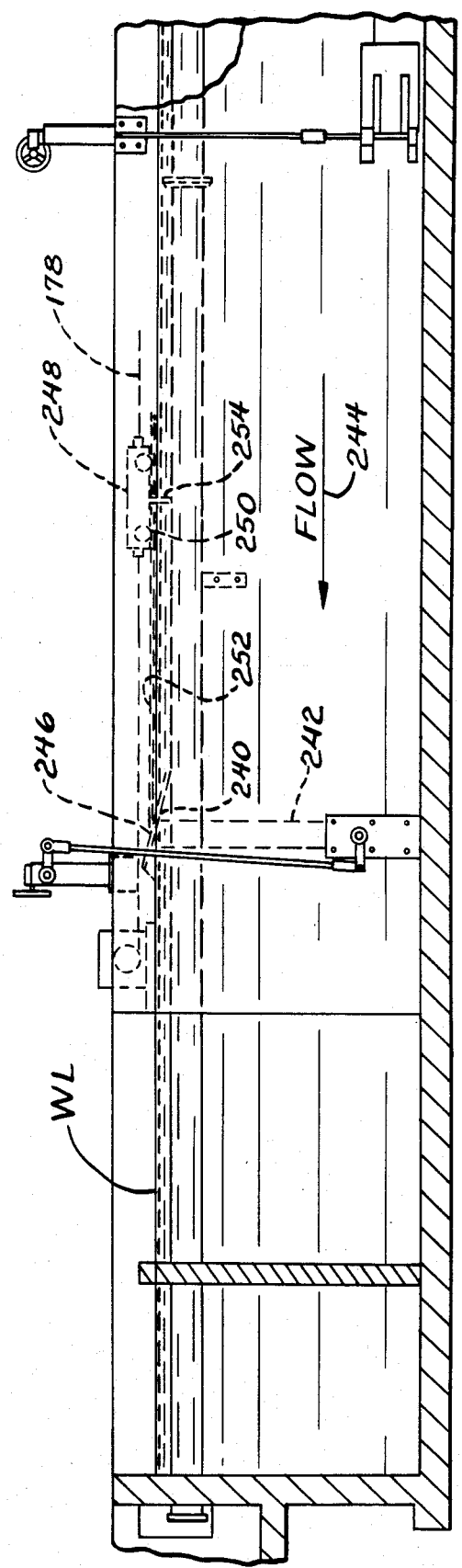

SIDEWALL MOUNTED CLARIFIER

FIELD OF THE INVENTION

This invention relates to a separator for removing solids from waste water, i.e., a clarifier, and more particularly, to such a separator which is adapted to be mounted along a wall in an oxidation vessel employed in waste water treatment.

BACKGROUND ART

Conventional waste water treatment systems conventionally include, amongst other components, a clarifier or a separator for removing solids from the waste water and an aeration vessel wherein components of the waste water are oxidized. Because a typical installation employs separators and aeration vessels which are separate from each other, they may be more costly from the capital standpoint in that the excavation costs, the costs of forming the vessel, usually out of concrete, erection costs including painting, plumbing and electrical installations are increased over what would be required if but a single vessel were to be made. Operational expenses are likewise increased in that some means must be provided for returning solids from the bottom of the separator back to the aeration tank which might be costly to operate.

To eliminate these problems, in recent years there have been proposals of oxidation vessels provided with internal separators or clarifying devices. One such construction is illustrated in U.S. Pat. No. 4,303,516 issued Dec. 1, 1981 to Stensel et al. Another construction is shown, for example in U.S. Pat. No. 4,383,922 issued May 17, 1983 to Beard. Other similar proposals wherein clarifiers are included in an aeration basin includes the so-called BMTS intrachannel clarifier and a similar design offered by Aero-Mod Inc. of Manhatten, Kan.

While such proposals have eliminated or reduced the above enumerated cost factors associated with systems employing separate clarifiers or separators and aeration vessels, they are not without drawbacks of their own. For example, the clarifier constructions act as a restriction in the channel of the aeration vessel. That is, they act as a transverse baffle. This in turn blocks movement of scum or floating material requiring the presence of some means for removing the scum and the floating material from the sides of the clarifier.

Moreover, the restrictive nature of such systems frequently interferes with the velocity of the waste water moving in the aeration vessel such that velocity gradients may occur. Where a low velocity area is generated, undesirable sludge deposition is likely to occur.

When steps are taken to eliminate the velocity problem, frequently the depth of the vessel in the vicinity of the clarifier will be made much greater. This in turn increases the construction costs and has potential problem posed by the existence of significant ground water or, in the alternative, may require extensive excavation into underlying bedrock.

In others, the design of the clarifier may be such as to allow so-called "short circuiting" meaning that the waste water does not uniformly flow through the entire volume of the separator but takes a path of lesser size. This of course means that the velocity of the waste water in the reduced path is increased over the design velocity which in turn may interfere with the settling of solids in the waste water.

In order to overcome these difficulties, in the commonly owned application of Kersten, Ser. No. 527,015, filed Aug. 29, 1983, now U.S. Pat. No. 4,487,692, and entitled "Sidewall Mounted Separator for Removing Solids and Waste Water" there is proposed a clarifier construction which avoids velocity gradients and which may be easily disposed in existing aeration vessels and/or does not require unusual excavation when installed as part of a newly constructed aeration vessel. The present invention constitutes a further improvement employing the principles of the Kersten separator.

SUMMARY OF THE INVENTION

It is the principal object of the invention to provide a vessel wherein both aeration or oxidation and separation or clarification may occur. More specifically, it is an object of the invention to provide such a vessel which eliminates the difficulties heretofore associated with scum and floating material and interference with desired flow velocity.

According to one facet of the invention, there is provided a vessel having a flow path, a bottom and at least one vessel wall. Means are provided for introducing waste water to be treated into the vessel along with means for moving waste water within the vessel along the flow path. Means are also included for introducing an oxygen containing medium into the waste water within the vessel to promote oxidation of organic solids in the waste water. A clarifier is mounted on the vessel wall and within the vessel. The clarifier includes a clarifier wall elongated in the direction of the flow path and relatively narrowly spaced from the vessel wall. The clarifier wall further extends upwardly within the vessel to a location above the intended level of waste water within the vessel and additional walls on the upstream and downstream ends of the clarifier extend between the same and the clarifier wall so that the walls define an elongated, narrow clarifying chamber having an upper end and a lower end. The lower end of the chamber is substantially closed and baffle means are disposed within the chamber between the upper and lower ends. Inlets for the chamber are located toward the upstream end of the clarifier wall and at intervals along the wall. The inlets are disposed at the lower end of the chamber. Means are provided at the upper end of the chamber for withdrawing clarified water therefrom at a rate such that organic solids and waste water within the chamber may settle therein and means are located in the chamber at the lower end for removing settled organic solids from the chamber.

According to another facet of the invention, there is provided a vessel, a waste water introducing means, a waste water moving means, a waste water oxygen introducing means and clarifier walls and additional walls as before. According to this facet of the invention, the clarifier wall extends from the bottom of the vessel, the bottom of the vessel providing for the closing of the lower end of the clarifier chamber. This arrangement provides excellent isolation of the interior of the clarifying chamber from the flow in the oxidation vessel to promote settling of organic solids.

According to still another facet of the invention, there is also provided a vessel, waste water introducing means, waste water moving means, waste water oxygen introducing means, and a clarifier having a clarifier wall and additional walls as before. According to this embodiment of the invention, there are provided a plurality of inlets located in the clarifier wall along the length thereof at spaced locations and at the lower end of the clarifier chamber.

Preferably, the inlets are controllable so that they may be individually adjusted to obtain optimum velocities within the clarifier along the entire length thereof.

Other objects and advantages will become apparent from the following specification taken in connection with the accompanying drawings.

DESCRIPTION OF THE DRAWINGS

FIG. 1 is a plan view of a waste water treatment system made according to the invention;

FIG. 2 is an enlarged fragmentary plan view of a portion of the system, specifically that including a clarifier made according to the invention;

FIG. 3 is an enlarged, fragmentary vertical section taken approximately along the line 3—3 in FIG. 2;

FIG. 5 is a plan view of a modified and preferred embodiment of a waste water treatment system made according to the invention;

FIG. 6 is a vertical section taken approximately along the line 6—6 in FIG. 5;

FIG. 8 is a vertical section of another modified embodiment.

DESCRIPTION OF THE PREFERRED EMBODIMENT

Figure 4:
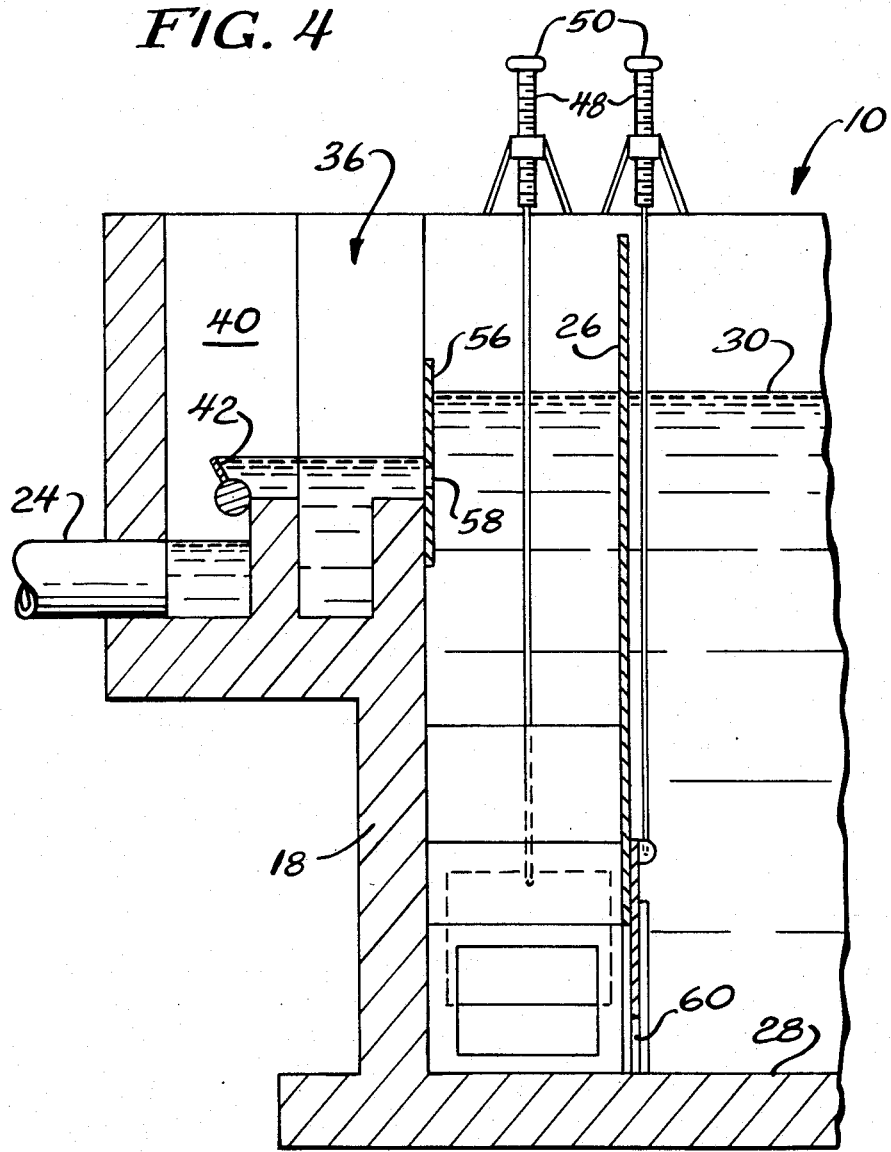
FIG. 4 is an enlarged, fragmentary vertical section taken approximately along the line 4—4 in FIG. 2.

An exemplary embodiment of a waste water treatment system made according to the invention is illustrated in the drawings. With reference to FIG. 1, the same is seen to include an oxidation vessel 10 in the form of a so-called "oxidation ditch". The vessel 10 is oval in shape having a central partition or wall 12. As a consequence, there is defined an elongated, closed loop flow path for the flow of waste water as schematically illustrated by arrows 14.

The sides of the vessel 10 may be earthen or lined as desired but in the area of a clarifier made according to the invention, generally designated 10, it is preferred that the vessel have a generally vertically extending concrete wall 18. And while the clarifier 16 is shown in FIG. 1 as being abutted against an exterior wall of the vessel 10, it should be understood that the same may be mounted on an interior wall as, for example, the partition 12 if desired.

In any event, aeration rotors 20 of conventional construction extend across the flow path at various locations about the vessel 10 and are rotated in a conventional fashion to provide the dual function of impelling the waste water in the directions of the arrows 14 and along the flow path and for introducing an oxygen containing medium, typically air, into the waste water to promote oxidation of organic solids therein. As is well known, the rotors 20 will typically be only partially submerged in the waste water within the vessel 10. Alternatively, aeration systems other than impellers can be used as, for example, diffused air, downpumping, turbine, or a combination of propellers and diffused air. In some cases, means in addition to the aeration systems will be required to impel the waste water in the direction of the arrows 14.

A waste water inlet for the vessel 10 is schematically illustrated at 22. Similarly, an outlet for clarified water is schematically illustrated at 24.

As can be seen from FIG. 1, the clarifier 16 is extremely narrow in relation to the width of the vessel 10 and considerably elongated in the direction of flow represented by the arrows. The narrow width is to avoid any significant incursion into the width of the flow path that would interfere with the attainment of the desired velocity therein. The purpose of the elongation is to provide adequate clarifying capacity while allowing the clarifier 16 to be narrow to avoid interference with velocity.

Turning now to FIGS. 2-4, the clarifier 16 is seen to include an imperforate, generally vertically extending sidewall 26 which extends generally in the direction of the flow path represented by the arrows 14. As best seen in FIG. 4, the wall 26 extends from the bottom 28 of the vessel 10 to a location above the intended level 30 of waste water within the vessel 10.

As seen in FIGS. 2 and 3, at the upstream end of the sidewall 26 there is located a vertically disposed end wall 32 which may have the contour illustrated in FIG. 3 for hydrodynamic purposes. At the downstream end of the wall 26, a similar vertically disposed wall 34 is located. The walls 32 and 34 interconnect the vessel wall 18 and the sidewall 26 of the clarifier 16 and may be angled or otherwise shaped so as to avoid the accumulation of scum or floating material thereon by allowing the velocity of waste water within the flow path to sweep past the walls 32 and 34 and scrub the same of scum or floating material.

In one embodiment of the invention, an elongated launder or trough 36 extends the length of the clarifier 16 and is disposed on the outer side of the wall 18. As will be seen, clarified affluent emerging from the upper end of the clarifier 16 will spill into the launder 36 to flow in the direction of arrows 38 to a collection and control basin 40 formed centrally of the launder 36 which is in fluid communication with the outlet 24. As seen in FIG. 4, an adjustable weir 42 may be interposed along the interface of the collection basin 40 and the launder 36 to control the level of effluent in the latter, and ultimately, the level 30 of waste water within the vessel 10.

As can be seen in FIG. 3, at its lower end, the upstream wall 32 is provided with an inlet 44 through which waste water containing organic solids may enter the clarifier 16. A vertically movable door 46 operated by a screw shaft shown schematically at 48 in connection with a hand wheel 50 is provided to control the effective size of the inlet 44, and thus the rate of flow of waste water into the clarifier 16 at that point.

Within the clarifier 16, between its lower and upper ends, there is disposed a series of baffles 52. Each baffle has an angularly disposed lower end 54 directed downstream in terms of the direction of the flow of waste water shown by arrows 14.

Above the baffles, and along the entire length of the launder 36 is a vertically extending plate 56 having a plurality of apertures 58 therein which establish fluid communication between the vessel 10 and the launder 36. The apertures 58 are located below the intended level 30 of waste water in the vessel 10 and as such, constitute the exit path for clarified effluent from the vessel 10 to the launder 36. The number of apertures 58 and their locations and sizes are chosen so as to allow the desired flow rate of effluent out of the vessel 10 and to assure that a certain velocity of upward flow of waste water within the clarifier 16 itself is established. Such velocity must be less than the settling velocity of organic solids in the waste water. At the same time, the number of apertures 58 must be such so that they may be located to avoid short circuiting of effluent. Consequently, waste water entering the clarifier through the inlet 44 will be moving at a sufficiently slow velocity so as to allow organic solids to settle out to the bottom 28 of the vessel between the vessel wall 18 and the clarifier wall 26. In this respect, the angled disposition of the bottoms 54 of the baffles 52 serve to promote such settling.

Because effluent may leave the clarifier along its entire length, in order to assure that desired velocities are obtained along the entire length of the clarifier 16, the clarifier sidewall 26 may be provided with inlet openings 60 at desired locations along its length. Vertically movable doors 62 also operated by screw shafts 48 and hand wheels 50 may be utilized to control the height of the doors 62, and thus the effective size of the inlet defined by the openings 60 to achieve the desired flow rate.

Desirably, the clarifier 16 may be made of a plurality of individual modules, the various modules being separated by intermediate walls such as that shown at 64 in FIG. 3. Preferably, the inlets 60 and the sidewall 26 are located just downstream from the walls 64. Immediately upstream of the inlet 60 and below the walls 64, the bottom 28 of the vessel 10, at locations between the clarifier sidewall 26 and the vessel wall 18 may be provided with openings 70. Such openings 70 may be provided with doors 72 mounted on horizontal pivots 74 and movable between the solid and dotted positions shown in FIG. 3 by suitable operation of a hand wheel 76 connected to a screw shaft 78. A collection trough 80 may directly underlie each of the openings 70 and is connected to a sludge removal conduit 82.

Thus, when the doors 72 are moved to the dotted line position illustrated in FIG. 3, settled solids or sludge in each such section of the clarifier will move under the influence of the flow velocity in the lower end thereof to be deposited in the collection trough 80. Preferably, the door 72, when in its fully opened position, substantially abuts the lower end of the corresponding wall 64 to prevent the passage of settled solids into the immediately downstream section of the clarifier 16.

The removal of solids from the collection trough 80 may be effected in any desired fashion as, for example, by pumping, by mechanical conveyors such as augers, or by water assisted ejection processes as desired.

Figure 7:
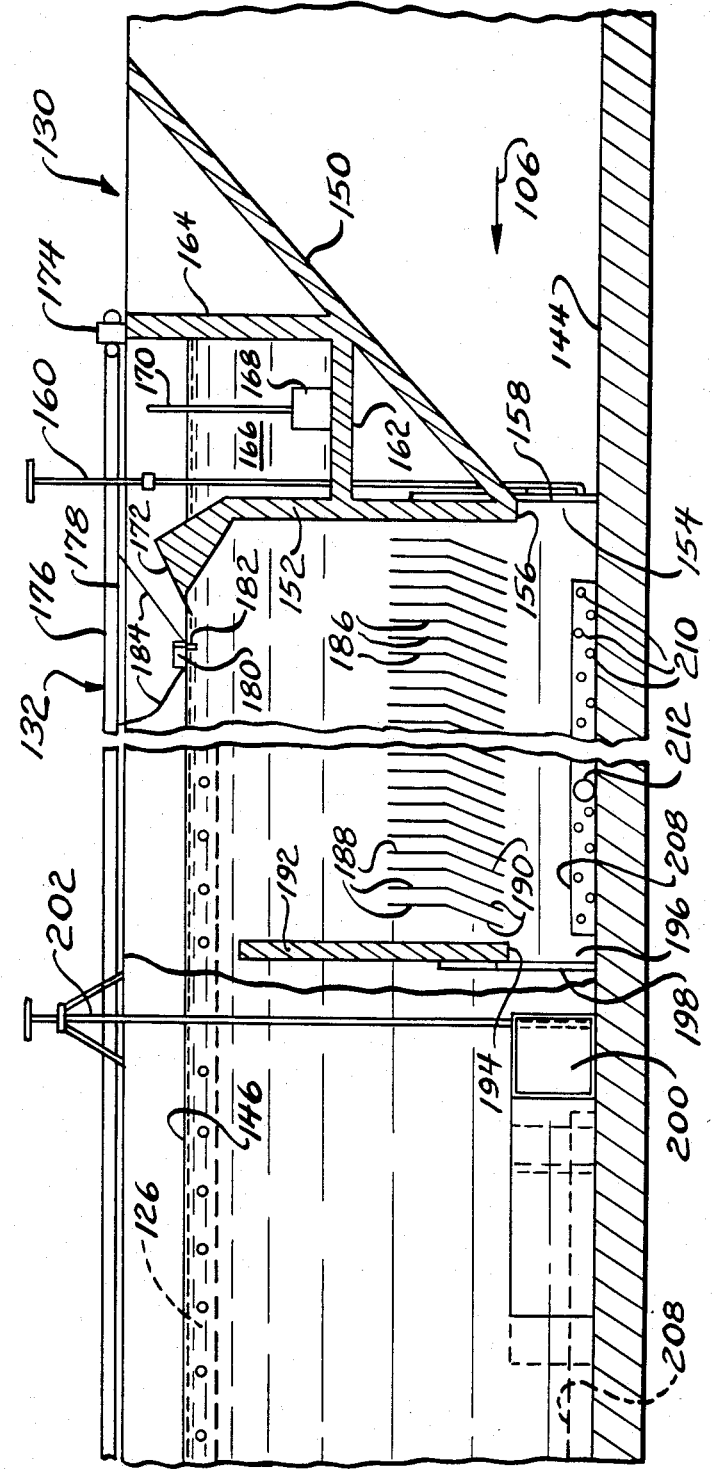
FIG. 7 is a vertical section taken approximately along the line 7—7 in FIG. 5.

Referring now to FIGS. 5-7 inclusive, a preferred embodiment of the invention will be described. Like the first embodiment, there is provided an elongated, oval shaped vessel 100 having an elongated divider 102 somewhat displaced from the center line to provide a so-called oxidation ditch. The divider 102 and the walls 104 of the vessel define an elongated, closed loop flow path with flow extending in the direction of an arrow 106.

Conventional aerating rotors 108 are disposed on one side of the divider 102 and on the opposite side, there are two clarifiers, generally designated 110 and 112 which may be mirror images of each other. The clarifier 110 is disposed along the wall 104 of the vessel 10 while the clarifier 112 is disposed along the divider 102 in facing relation to the clarifier 110.

Generally J-shaped flow directors 114 may be disposed at opposite ends of the vessel 100 and serve to channel the flow of waste water within the vessel 100 as it reverses its direction of flow at the ends of the vessel 100.

Adjacent one end 116 of the vessel 100 is an influent pipe 118 through which waste water to be treated may be introduced into the vessel 100. The end 118 is also provided with an effluent box 120 having an effluent pipe 122 extending therefrom to convey effluent from the vessel 100 to a point of disposal. A pair of effluent pipes 124 and 126 respectively associated with the clarifiers 110 and 112 provide effluent from the clarifiers 110 and 112 to the interior of the effluent box 120. An adjustable weir gate 128 of any known construction is disposed between the effluent pipes 124 and 126 on the one hand and the effluent pipe 122 on the other.

Returning now to the clarifiers 110 and 112. The same will be described in detail. Inasmuch as one is a mirror image of the other, only one will be described in the interest of brevity.

Each clarifier has an upstream end generally designated 130 which is forwardmost in the flow path illustrated by the arrows 106. Immediately following the upsteam end 130 is a plurality of at least two separator sections. In the illustrated embodiment, each clarifier includes three such sections, generally designated 132, 134 and 136. The downstreammost separator section 136 is followed by an end section, generally designated 140.

Each clarifier 110 and 112 includes a generally vertically extending wall 142 which is relatively narrowly spaced from the adjacent wall 104 or divider 102, as the case may be. As seen in FIG. 6, the clarifier walls 142 extend upwardly from the bottom 144 of the vessel 100 to a point above the intended level of waste water 146 within the vessel 100.

As a consequence of this construction, the clarifiers 110 and 112 are elongated and relatively narrow.

Referring to FIG. 7, the upstream end 130 of each clarifier is defined by a downwardly extending diagonal surface 150 which terminates at a location just above the bottom 144 of the vessel at the upstream end 152 of the first separator section 132. The surface 150 thus tends to direct flow of waste water within the vessel towards an opening 154 defined by the bottom 144 of the vessel 110 and the lower edge 156 of the upstream end 152. A slidable gate 158 may be used to open or close the inlet 154 which serves as an inlet to the first separator section 132. A conventional hand wheel operator 160 may be utilized to control the position of the gate 158.

Between the upstream end 152 of the first separator section 132 and the surface 150 are walls 162 and 164 which, together with the clarifier wall 142 and the wall 104 for the divider 102 define a scum pit 166. A sump pump 168 is disposed in the scum pit 166 and by means of a conduit 170 may be operated to empty the scum pit 166 of scum.

The upstream end 152 of the first separator section 132 terminates in a crested top 172 which projects above the intended level 146 of waste water within the vessel. Disposed on each of the walls 142 or on the divider 102 or the wall 104, as desired, is a cable drive 174 for driving a cable having an upper run 176 and a lower run 178 along the length of the appropriate wall or divider. A float 180 having a depending skimming edge 182 is located between the wall 142 and the wall 104 of the clarifier 110 or the wall 142 and the divider 102 of the clarifier 112 and is flexibly attached by cables 184 to the lower run 178.

The cable drive 174 is bi-directional and the arrangement is such that the float 180 will float or be otherwise supported on the top of the waste water in the vessel with the skimming edge 182 below the surface thereof. By suitably operating the cable drive 174, the float 180 may be pulled along the entire length of the respective clarifier 110 or 112 to skim scum from the top of the waste water in the clarifier and push it up the crest 172 on the upstream end 152 of the first separator section and deposit the same in the scum pit 166 of the head end 130.

Within each separator section is a plurality of baffles 186 having vertical upper sections 188 and diagonal lower sections 190 angled away from the direction of flow. The baffles 186 are disposed above the bottom 144 of the vessel and well below the intended level 146 of waste water within each clarifier and serve the same purpose as the baffles 52 in the embodiment illustrated in FIGS. 1-4 inclusive.

At the downstream end of each separator section is a vertical partition 192 whose lower edge 194, together with the bottom 144, defines an opening 196 through which waste water may flow from an upstream separator section to a downstream separator section. A gate 198 is provided in connection with each opening 196 and may be operated by any suitable type of hand wheel mechanism 199 to control the flow through the opening 196.

At the upstream part of each of the separator sections 134 and 136 is an opening in the wall 142 immediately adjacent the bottom 144 which may be closed by a side gate 200. Each gate 200 may be opened or closed by means of a conventional handwheel operator 202 and the same serve as controllable inlets to the separator sections downstream from the first separator section 132.

As seen in FIG. 6, at the lower ends of each clarifier 110 and 112, throughout the sections thereof, except in the vicinity of the side gates 200 and the gates 198, there are provided sloping surfaces 204 and 206 to define a hopper-like configuration. At the apex of the hopper thus defined is an elongated section of relatively large diameter pipe 208 provided with, for example, approximately one inch apertures 210 on staggered centers. The pipes 208 may rest on the bottom 144 and are connected to sludge draw-off pipes 212. Thus, settled organic solids in each clarifier 110 and 112 will be directed by the sloping surfaces 206 to be in proximity to the pipes 208 so that the solids may enter the same through the apertures 210 and ultimately exit the associated clarifier via the sludge draw-off pipes 212.

Mention should also be made in relation to FIG. 6 of the presence of the effluent pipes 124 and 126 in each of the clarifiers 110 and 112. It will be seen that the same are located just below the intended level 146 of waste water and extend throughout all of the separator sections. The effluent pipes 124 and 126, and specifically, those portions thereof within the separator sections, are provided with apertures which serve the same function as the apertures 58 described in connection with the embodiment of FIGS. 1-4 inclusive.

Additional inlets are provided to each of the separator sections. The inlets are in the form of gates 220 provided with any desired form of operator 222 at the locations illustrated in FIG. 5 in connection with the clarifier 110, it being understood that similar gates are provided in connection with the clarifier 112 as well.

As best seen in FIG. 6, the gates 220 are just below the intended level 146 of waste water in the vessel and when opened, serve to allow mixed liquor to enter the associated clarifier at the top thereof.

In normal operation, the gates 220 will be maintained in a closed position. However, when it is desired to waste sludge from the clarifiers to the draw-off pipes 212, the gate 158 as well as all gates 198 and gates 200 will be closed to isolate the various separator sections from each other and from the waste water in the vessel 100. The gates 220 may then be opened, causing a downward flow within each of the separator sections which allows the accumulated sludge in each to be removed through the pipes 208 in a more concentrated condition.

FIG. 8 illustrates a modified and preferred alternative to the scum skimmer shown in FIG. 7 and described in connection therewith. In the embodiment shown in FIG. 8, the upper end of the downstream wall 242 of the clarifier in the direction of flow shown by an arrow 244 is provided with an upwardly inclined ramp plate 246 which extends from a location below the intended level of waste water within the vessel at a point inside the clarifier to a location above the intended level of waste water downstream of the wall 242. In lieu of the float 180 (FIG. 7), the lower run 178 of the cable is connected to a cart-like construction 248 having wheels 250 riding in tracks 252 in opposite sides of each clarifier. The cart 248 mounts a depending, preferably spring-loaded skimming blade 254 which normally is disposed below the intended level of waste water within the vessel. Thus, by moving the cart 248 toward the ramp plate 246 with the skimmer blade 254 in a lowered position, scum that surfaces within each clarifier can be collected and raked up the ramp plate 246 and returned to the main oxidation channel of the vessel on the downstream side of the clarifier.

A suitable camming mechanism may be provided within the cart 248 with trips at opposite ends of the clarifier to operate the blade 254 so that the same is in the position illustrated in FIG. 8 when the cart 248 is moving toward the ramp plate 246 and is retracted to a position above the intended level of waste water when moving in the opposite direction. Alternatively, the blade could be controlled by pivoting the same within the cart 248 and connecting the same to the lower run 178 of the cable therewithin and providing a lost motion connection between the lower run 178 and the cart 248 to appropriately pivot the blade 254 between upper and lower positions depending upon which side of the lower run 178 of the cable is being tensioned by pulling action. This embodiment of a skimmer has an advantage over that shown in FIG. 7 in terms or reduced cost since the scum pit 166 and pump 168 may be eliminated.

A clarifier made according to the present invention provides a number of advantages over those previously known. For one, the closing of the bottom of the clarifier confines settling solids or sludge so that sludge outlets such as provided by the opening 70 or the pipes 208 may be advantageously utilized. Similarly, such closing of the bottom of the clarifier isolates waste water flow within the clarifier from that within the remainder of the vessel 10 such that the flow currents in the latter do not disturb the settling process occurring in each clarifier.

A further advantage is obtained in the provision of a series of inlets along the length of the clarifier which can be individually controlled to allow the optimization of velocities along the entire length of the clarifier. This feature allows the maximization of the settling process while avoiding high velocities of a localized nature that could result in undesirable short circuiting.

Furthermore, the embodiment illustrated in FIGS. 5-7 provides the additional advantage of not requiring sludge removal components to be disposed below the bottom of the vessel which allows a substantial reduction in the cost of construction of the overall system.

We claim:

1. A waste water treatment system comprising:
   means defining a vessel having a closed loop flow path, a bottom, and at least one vessel wall;
   means for introducing waste water to be treated into said vessel;
   means for moving waste water within said vessel along said path;
   means for introducing an oxygen containing medium into waste water within said vessel to promote oxidation of organic solids in the waste water;
   a clarifier mounted on said vessel wall and within said vessel, said clarifier including a clarifier wall elongated in the direction of said flow path and relatively narrowly spaced from said vessel wall, and further extending from said bottom to a location above the intended level of waste water within said vessel, and additional walls on the upstream and downstream ends of said clarifier wall extending between the same and said clarifier wall so that said walls define an elongated, narrow clarifying chamber having an upper end and a substantially closed lower end, said substantially closed lower end providing isolation of the interior of said chamber from flow in said vessel to promote setting of organic solids;
   baffle means within said chamber between said upper and lower ends;
   an inlet for said chamber at or adjacent to said upstream end of said clarifier wall and at said lower end of said chamber; and
   means at said upper end of said chamber for withdrawing clarified water therefrom at a rate such that organic solids in waste water within said chamber may settle therein.

2. The waste water treatment system of claim 1 further including means at the lower end of said chamber for withdrawing settled organic solids therefrom.

3. The waste water treatment system of claim 1 wherein said inlet is controllable.

4. The waste water treatment system of claim 3 wherein there is at least one additional controllable inlet to said chamber and located in said clarifier wall intermediate its ends at said chamber lower end.

5. A waste water treatment system comprising:
   means defining a vessel having a flow path, a bottom, and at least one vessel wall;
   means for introducing waste water to be treated into said vessel;
   means for moving waste water within said vessel along said path;
   means for introducing an oxygen containing medium into waste water within said vessel to promote oxidation of organic solids in the waste water;
   a clarifier extending along said vessel wall and within said vessel, said clarifier including a clarifier wall elongated in the direction of said flow path and spaced from said vessel wall and extending from said bottom to a location above the intended level of waste water within said vessel, and additional walls on the upstream and downstream ends of said clarifier wall extending between the same and said clarifier wall so that said walls define an elongated, clarifying chamber having an upper end and a lower end, said lower end being substantially closed, said substantially closed lower end providing isolation of the interior of said chamber from flow in said vessel to promote setting of organic solids;
   baffle means within said chamber between said upper and lower ends;
   a plurality of inlets for said chamber spaced along the length of said clarifier wall and at said lower end of said chamber; and
   means at said upper end of said chamber for withdrawing clarified water therefrom at a rate such that organic solids in waste water within said chamber may settle therein.

6. The waste water treatment system of claim 5 wherein said lower end is closed by said bottom of said vessel and one of said inlets is located at said upstream end.

7. The waste water treatment system of claim 5 further including means in said clarifier for removing settled organic solids from said lower end.

8. The waste water treatment system of claim 7 wherein said removing means are located immediately upstream of said inlets.

9. The waste water treatment system of claim 7 wherein said removing means re elongated and disposed at said lower end of said clarifier for removing settled organic solids along the length thereof.

10. The waste water treatment system of claim 9 wherein said removing means comprised an apertured pipe disposed just above said bottom.

11. A waste water treatment system comprising:
    means defining a vessel having a flow path, a bottom, and at least one vessel wall;
    means for introducing waste water to be treated into said vessel;
    means for moving waste water within said vessel along said path;
    means for introducing an oxygen containing medium into waste water within said vessel to promote oxidation of organic solids in the waste water;
    a clarifier mounted on said vessel wall and within said vessel, said clarifier including a clarifier wall elongated in the direction of said flow path and relatively narrowly spaced from said vessel wall, and further extending upwardly within said vessel to a location above the intended level of waste water within said vessel, and additional walls of the upstream and downstream ends of said clarifier wall extending between the same and said clarifier wall so that said walls define an elongated, narrow clarifying chamber having an upper end and a lower end, said lower end being substantially closed, said substantially closed lower end providing isolation of the interior of said chamber from flow in said vessel to promote setting of organic solids;
    baffle means within said chamber between said upper and lower ends;
    an inlet for said chamber located toward said upstream end of said clarifier wall and at said lower end of said chamber;
    means at said upper end of said chamber for withdrawing clarified water therefrom at a rate such that organic solids in waste water within said chamber may settle therein; and means in said chamber at said lower end for removing settled organic solids from said chamber.

12. The waste water treatment system of claim 11 wherein said clarifier wall extends downwardly to said bottom so that said lower end is closed by said bottom, and wherein there are a plurality of said inlets spaced from each other and located along the length of said clarifier wall, including an inlet in said upstream additional wall; each said inlet being provided with an operable door, and means for controlling the degree to which each said door is opened.

13. The waste water treatment system of claim 11 further including an additional inlet in said clarifier wall near the intended level of waste water in said vessel and operable to admit waste water to said clarifier above said removing means to enhance removal of settled organic solids.

14. The waste water treatment system of claim 13 wherein said vessel is elongated and includes an elongated divider defining a closed loop flow path, and wherein there are two said clarifiers, one along said wall and the other along said divider.

* * * * *